(12) United States Patent
Hidalgo Vivas et al.

(10) Patent No.: US 12,291,682 B2
(45) Date of Patent: May 6, 2025

(54) SELECTIVE PRODUCTION OF LIGHT SYNTHETIC GASOLINE

(71) Applicant: TOPSOE A/S, Kgs. Lyngby (DK)

(72) Inventors: Angelica Hidalgo Vivas, Herlev (DK); Henrik Wolthers Rasmussen, Friendswood, TX (US); Ian Menjon, Copenhagen Ø (DK); Ole Frej Alkilde, Valby (DK); Arne Knudsen, Copenhagen Ø (DK)

(73) Assignee: TOPSOE A/S, Kgs. Lyngby (DK)

( * ) Notice: Subject to any disclaimer, the term of this patent is extended or adjusted under 35 U.S.C. 154(b) by 315 days.

(21) Appl. No.: 17/906,807

(22) PCT Filed: Mar. 31, 2021

(86) PCT No.: PCT/EP2021/058423
§ 371 (c)(1),
(2) Date: Sep. 20, 2022

(87) PCT Pub. No.: WO2021/204621
PCT Pub. Date: Oct. 14, 2021

(65) Prior Publication Data
US 2023/0227739 A1   Jul. 20, 2023

Related U.S. Application Data

(60) Provisional application No. 63/005,852, filed on Apr. 6, 2020.

(30) Foreign Application Priority Data

Jun. 12, 2020 (EP) .................................... 20179758

(51) Int. Cl.
*C10G 69/02* (2006.01)
*C10G 3/00* (2006.01)
*C10G 67/02* (2006.01)

(52) U.S. Cl.
CPC ............... *C10G 69/02* (2013.01); *C10G 3/42* (2013.01); *C10G 67/02* (2013.01); *C10G 2300/202* (2013.01); *C10G 2400/02* (2013.01)

(58) Field of Classification Search
CPC .......... C10G 69/02; C10G 3/42; C10G 67/02; C10G 2300/202; C10G 2400/02;
(Continued)

(56) References Cited

U.S. PATENT DOCUMENTS 4,127,471 A    11/1978  Suggitt
4,304,951 A *  12/1981  Garwood ............... C10G 45/58
                                                    585/639

(Continued)

FOREIGN PATENT DOCUMENTS

CA    3090050 A1 *  8/2019  ............... C07C 1/20
CN    1711341 A     12/2005
(Continued)

OTHER PUBLICATIONS

European Search Report issued in corresponding Patent Application No. EP 20 17 9758 dated Oct. 15, 2020.
(Continued)

*Primary Examiner* — Ali Z Fadhel
(74) *Attorney, Agent, or Firm* — Boone IP Law

(57) ABSTRACT

A production plant and a method for production of a synthetized gasoline product from a synthetic hydrocarbon mixture produced from a mixture of reactive oxygenates, the method including a. separating the synthetic hydrocarbon mixture in at least a light hydrocarbon fraction, and a higher boiling hydrocarbon fraction, wherein the higher boiling fraction comprises at least 70% of the molecules including 10 or more carbon atoms and less than 20% of the molecules comprising exactly 9 carbon atoms, b. directing at least an amount of said higher boiling hydrocarbon fraction as a
(Continued)

hydrocracking feedstock to contact a material catalytically active in hydrocracking under effective hydrocracking conditions providing a hydrocracked hydrocarbon stream, wherein at least an amount of said hydrocracked hydrocarbon stream is combined with at least an amount of said light hydrocarbon fraction, to provide said synthetized gasoline product having a $T_{90}$ being below $T_{90}$ of said synthetic hydrocarbon mixture.

14 Claims, 8 Drawing Sheets

(58) Field of Classification Search
CPC ........ C10G 45/64; C10G 47/02; C10G 65/14; Y02P 30/20
See application file for complete search history.

(56) References Cited

U.S. PATENT DOCUMENTS

| | | | |
|---|---|---|---|
| 4,387,261 A * | 6/1983 | Chester | C10G 3/50 585/419 |
| 4,968,402 A | 11/1990 | Kirker | |
| 10,150,714 B2 | 12/2018 | Hidalgo | |
| 2001/0014645 A1 | 8/2001 | Ishikawa | |
| 2004/0173502 A1 | 9/2004 | DeHaan | |
| 2006/0157384 A1 | 7/2006 | Adams | |
| 2015/0368571 A1 | 12/2015 | Mehlberg | |

FOREIGN PATENT DOCUMENTS

| | | |
|---|---|---|
| CN | 104334693 A | 2/2015 |
| CN | 104419455 A | 3/2015 |
| CN | 104447159 A | 3/2015 |
| CN | 107206365 A | 9/2017 |
| CN | 108855163 A | 11/2018 |
| CN | 110180581 A | 8/2019 |
| EP | 0512635 A2 | 11/1992 |
| EP | 1457546 A2 | 9/2004 |
| EP | 3015445 A1 | 5/2016 |
| JP | 2001059090 A | 3/2001 |
| WO | 0020534 A1 | 4/2000 |
| WO | 2013178375 A1 | 12/2013 |

OTHER PUBLICATIONS

Gonzalez et al., "Process comparison of biomass-to-liquid (BtL) routes Fischer-Tropsch synthesis and methanol to gasoline", Biomass Conversion and Biorefinery, vol. 1, No. 4, Oct. 2, 2011, pp. 229-243.

International Search Report (PCT/ISA/210) and Written Opinion (PCT/ISA/237) mailed on Jun. 15, 2021, by the European Patent Office as the International Searching Authority for International Application No. PCT/EP2021/058423.

Official Action in corresponding Chinese Patent Application No. 202180025773.3 dated Aug. 15, 2023.

* cited by examiner

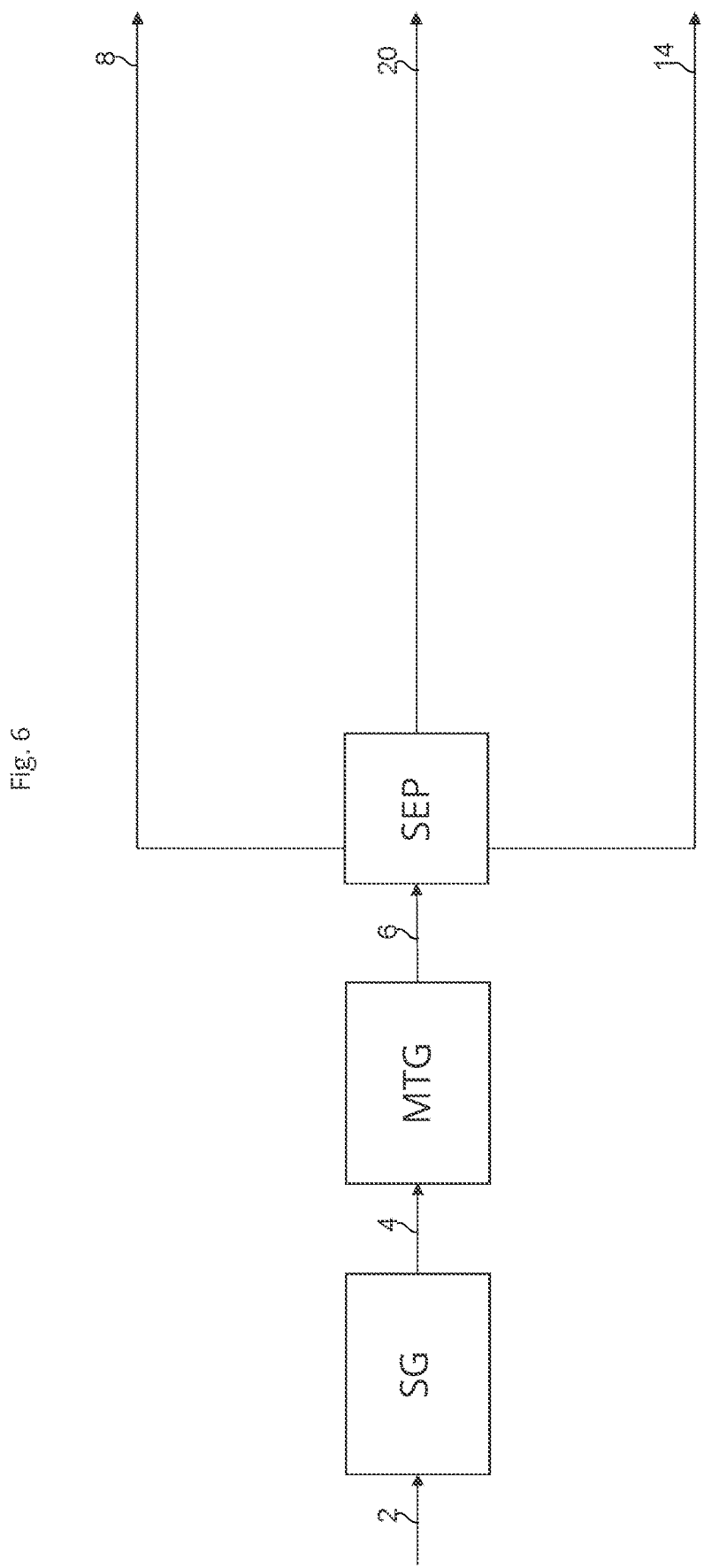

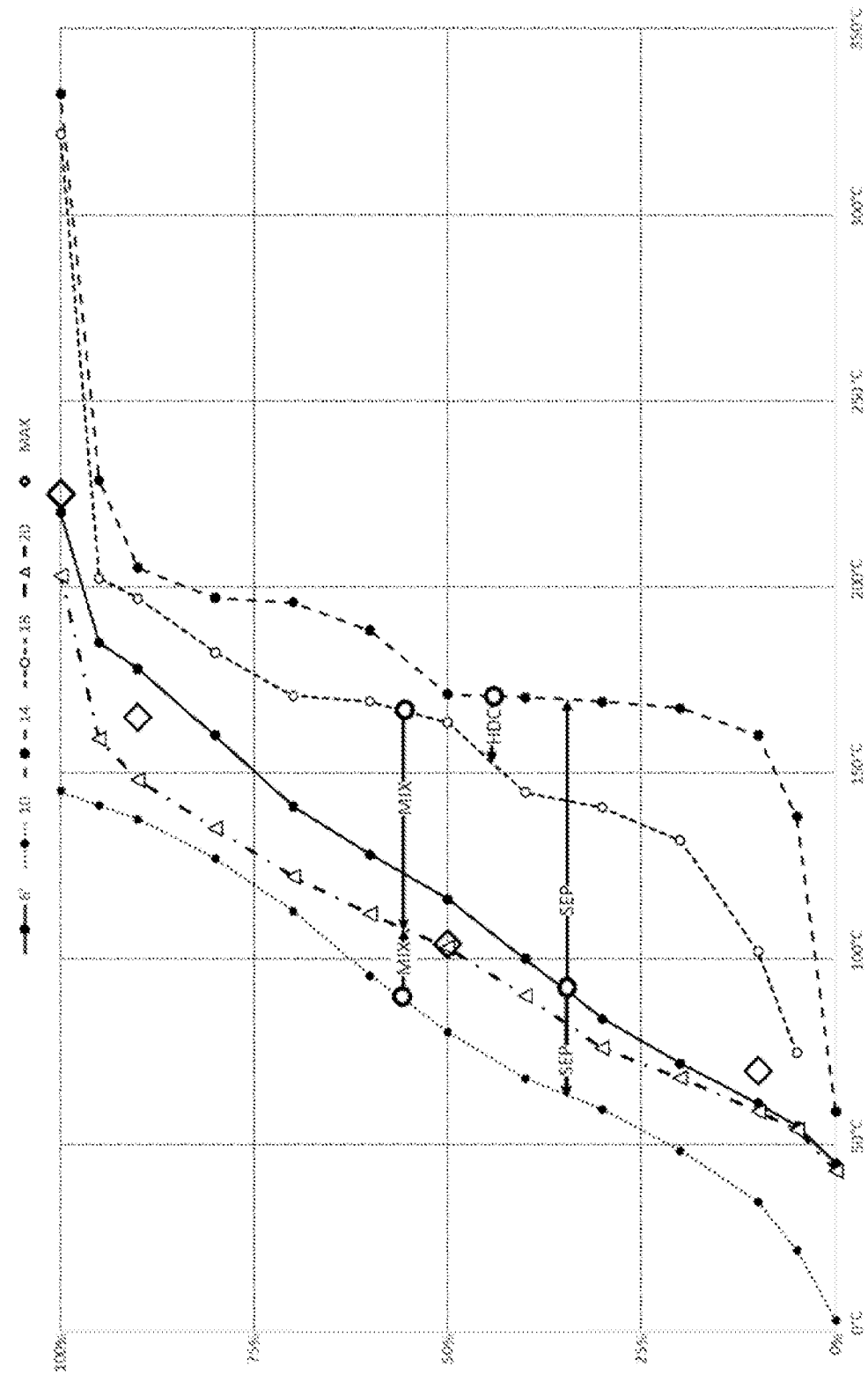

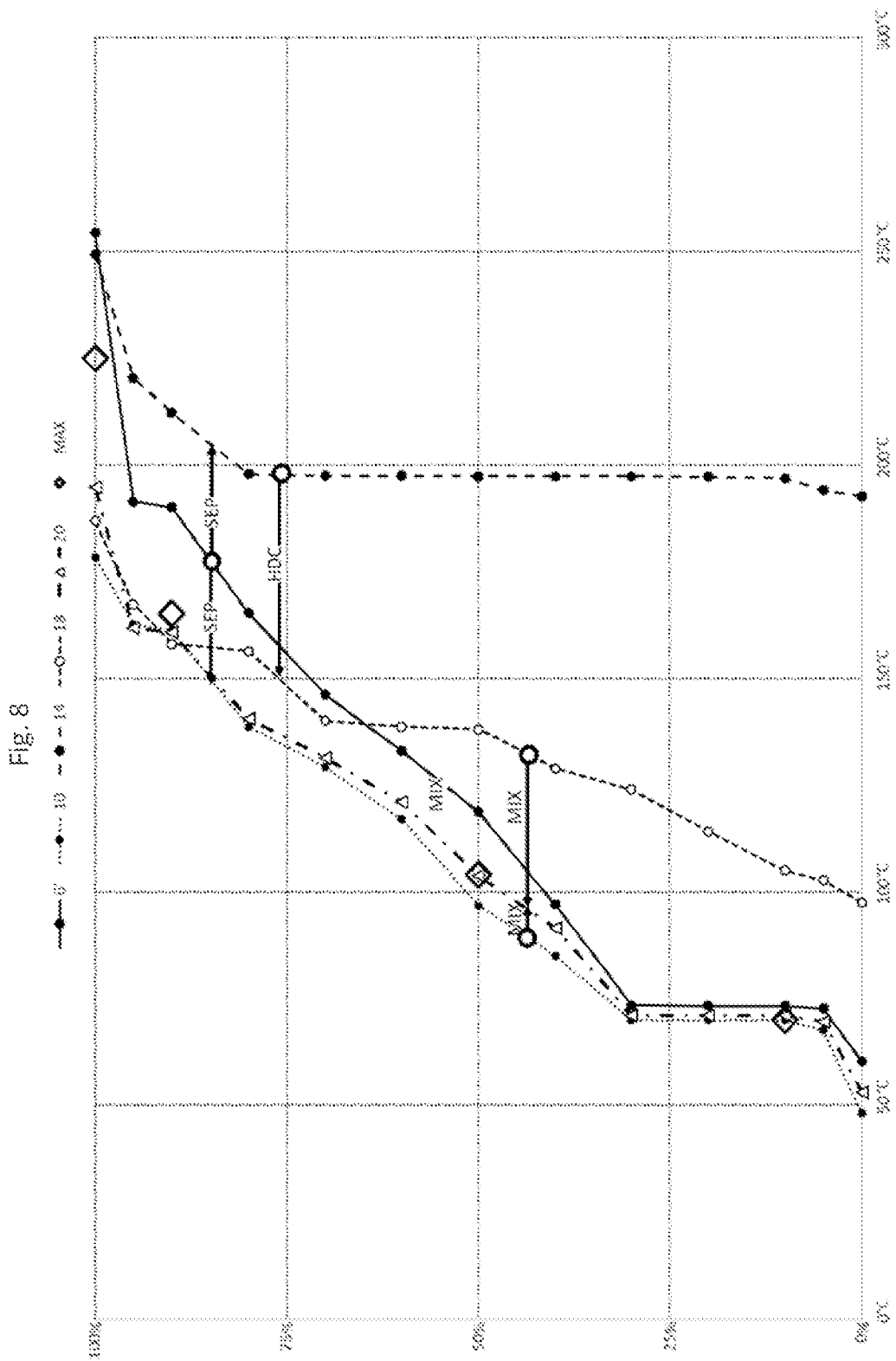

SELECTIVE PRODUCTION OF LIGHT SYNTHETIC GASOLINE

TECHNICAL FIELD

The present invention relates to a method and a process plant for production of a gasoline product with a low amount of high boiling hydrocarbons, from methanol and other oxygenates, which optionally may be produced from synthesis gas.

BACKGROUND

Production of synthetic gasoline from methanol and other easily convertible oxygenates (methanol to gasoline, MTG) either produced via synthesis gas of fossil or renewable origin or of other origins, results in a product being highly suitable as gasoline, but having a distillation curve, which compared to typical fractionated fossil feedstock, comprises more high boiling hydrocarbons.

In addition, there may be a distillation tail rich in by di-aromatic hydrocarbons, e.g., substituted naphthalenes, and other two-ring structures, e.g., substituted indenes, which have a tendency to formation of deposits during combustion and/or particle emissions in a vehicle engine. Therefore, restrictions are being imposed on the amount of high boiling hydrocarbons in gasoline. by setting limits to $T_{90}$ (temperature at which 90 vol % of the gasoline has been evaporated) and FBP (final boiling point), e.g. the US regulation ASTM D4814-20, the European specifications EN 228/2012-A1-2017 and the Chinese specifications GB 17930-2016. The product distribution from the MTG process will, by kinetics and equilibrium, be dictated to commonly involve an amount of product boiling above 190° C., which may be close to or in conflict with these regulations on high boiling hydrocarbons in gasoline. The heaviest product fraction could be removed by fractionation and used for fuel oil in the process, however, this option is associated with a loss of profit. Instead, it has now been identified that selective hydrocracking of a heavy gasoline fraction may be a cost effective way to bring the product in compliance with restrictive regulations. The selective hydrocracking could either be effectuated by operation in recycle and/or through a combination of catalyst choice and reaction conditions. A process may further be configured for selective isomerization in order to increase the product octane number.

SUMMARY

In the following the term effective conditions of a reaction shall be used to signify conditions, such as pressure, temperature and space velocity, under which the conversion by said reaction is at least 10%, unless otherwise stated.

In the following the term ppmw shall be used to signify weight parts per million.

In the following the term Cn shall be used to signify hydrocarbons with exactly n carbon atoms, e.g. C10 signifies hydrocarbons with exactly 10 carbon atoms. Similarly, Cn+ shall be used to signify hydrocarbons with at least n carbon atoms, e.g. C10+ signifies hydrocarbons with at least 10 carbon atoms In general, boiling points are determined according to ASTM D86, unless otherwise specified. In this respect Tn shall be used to signify the temperature at which n vol % has been distilled in the equipment defined by ASTM D86, e.g. $T_{90}$ is the temperature at which 90 vol % of the hydrocarbon mixture has been distilled.

In the following synthetic hydrocarbons refer to hydrocarbons produced from reactive oxygenates, such as methanol, ethanol and dimethyl ether, which are suitable for use in gasoline. The synthesis process produces a raw synthetic gasoline product which is rich in monoaromatics, such as at least 20 wt %, and typically above 25 wt % but contains only few normal-paraffins (less than 5 wt %), a significant amount of iso-paraffins (such as 20 wt % to 50 wt %), olefins (less than 15 wt %). For comparison, hydrocarbons synthesized by the Fischer-Tropsch method will comprise very low amounts of aromatics (less than 15 wt %) and pyrolysis products will contain high levels of olefins (above 15 wt %) and diolefins.

The raw synthetic gasoline product is typically split in a light fraction and a heavy C8+ or C9+ fraction, which is rich in monoaromatics, such as at least 50 wt %, and typically above 80 wt % but contains only few normal-paraffins (less than 1 wt %), a moderate amount of iso-paraffins (such as 5 wt % to 10 wt %), few olefins (less than 5 wt %) and is virtually free of di-olefins. The heavy fraction may typically be further characterized by the C9 aromatics being dominated by 1,2,4-trimethyl benzene (the concentration of 1,2,4-trimethyl benzene is above 20 wt % and the ratio of 1,2,4-trimethyl benzene to 1,2,3-trimethyl benzene is above 6:1 and typically above 50:1, contrary to fossil fuel derived gasoline where the ratio is around 4:1).

The raw synthetic gasoline product is may typically also, especially when synthesized from reactive oxygenates rich in methanol and/or dimethyl ether, be characterized by the C10 aromatics being dominated by 1,2,4,5-tetramethyl benzene (the concentration of 1,2,4,5-tetramethyl benzene is above 6 wt % and the ratio to the other tetramethyl benzenes is above 10:1 and typically above 20:1, contrary to fossil fuel derived gasoline where tetramethyl benzene is not present in significant quantities.

The compound 1,2,4-trimethyl benzene is also referred to as pseudocumene. The compound 1,2,3-trimethyl benzene is also referred to as hemimellitene. The compound 1,3,5-trimethylbenzene is also referred to as mesitylene. The compound 1,2,4,5-tetramethyl benzene is also referred to as durene.

A broad aspect of the present disclosure relates to a method for production of a synthetized gasoline product from a synthetic hydrocarbon mixture produced from a mixture of reactive oxygenates comprising the steps of a. separating the synthetic hydrocarbon mixture in at least a light hydrocarbon fraction, and a higher boiling hydrocarbon fraction, wherein the higher boiling fraction comprises at least 80% of the molecules comprising 10 or more carbon atoms present in the hydrocarbon mixture and less than 20% of the molecules comprising exactly 9 carbon atoms present in the synthetic hydrocarbon mixture, b. directing at least an amount of said higher boiling hydrocarbon fraction as a hydrocracking feedstock to contact a material catalytically active in hydrocracking under effective hydrocracking conditions providing a hydrocracked hydrocarbon stream, wherein at least an amount of said hydrocracked hydrocarbon stream, optionally after further hydroprocessing, is combined with at least an amount of said light hydrocarbon fraction, to provide said synthetized gasoline product having a $T_{90}$ according to ASTM D86 being below $T_{90}$ according to ASTM D86 of said synthetic hydrocarbon mixture, such as 10° C. or 20° C. below, with the associated benefit of such a process reducing the upper boiling point of the synthetized gasoline product, by hydrocracking C10 and C11 hydrocarbons, especially two-ring aromatics, while minimizing the yield loss of gasoline product.

In a further embodiment an isomerization feedstock being an amount of the synthetic hydrocarbon mixture, is directed to contact a material catalytically active in isomerization under effective isomerization conditions, and wherein the isomerization feedstock contains at least 70% of the molecules comprising exactly 9 carbon atoms of the synthetic hydrocarbon mixture with the associated benefit of such a process increasing the octane number of the synthetic hydrocarbon mixture, by conversion of pseudocumene to mesitylene.

In a further embodiment the aromatics comprising 10 or more carbon atoms in the isomerization feedstock accounts for less than 5%, 10% or 20% of the aromatics comprising 10 or more carbon atoms in the synthetic hydrocarbon mixture, with the associated benefit that when a minimum of C10+ aromatics are present in the isomerization feedstock, a majority is present in the high boiling hydrocarbon fraction such that the selective separation maximizes the amount of high boiling hydrocarbons to undergo hydrocracking.

In a further embodiment effective hydrocracking conditions involve a temperature in the interval 250-425° C., a pressure in the interval 30-150 Bar, and a liquid hourly space velocity (LHSV) in the interval 0.5-4, optionally together with intermediate cooling by quenching with hydrogen, feed or product and wherein the material catalytically active in hydrocracking comprises (a) one or more active metals taken from the group platinum, palladium, nickel, cobalt, tungsten and molybdenum, (b) an acidic support comprising one or more materials showing cracking activity such as amorphous acidic oxides and molecular sieves and (c) a refractory support such as alumina, silica or titania, or combinations thereof, with the associated benefit of such process conditions being highly suited for reducing the boiling point of the high boiling hydrocarbon fraction. The amorphous acidic oxides showing cracking activity may be silica-alumina and examples of molecular sieves showing cracking activity include those having a topology such as MFI, BEA and FAU. Typically, the conditions are chosen such that the amount of material boiling above 190° C. in said hydrocracked hydrocarbon stream fraction is reduced by at least 20% wt, 50% wt or 80% wt or more compared to said hydrocracker feed stream.

In a further embodiment said one or more active metals of said material catalytically active in hydrocracking are taken from the group consisting of nickel, cobalt, tungsten and molybdenum and the hydrocracking feedstock contacting the material catalytically active in hydrocracking comprises at least 50 ppmw sulfur, with the associated benefit of such a material catalytically active in hydrocracking having a low cost.

In a further embodiment said one or more active metals of said material catalytically active in hydrocracking are taken from the group consisting of platinum and palladium and the hydrocracking feedstock contacting the material catalytically active in hydrocracking comprises at less than 50 ppmw sulfur, with the associated benefit of such a material catalytically active in hydrocracking having a high selectivity.

In a further embodiment said hydrocracking process conditions are chosen, such that the ratio between hydrocarbons comprising exactly 10 carbon atoms in the hydrocracked hydrocarbon stream and the hydrocracking feedstock is less than 20%, with the associated benefit of such a high hydrocracking conversion simplifying the process by avoiding operation with recycle.

In a further embodiment the method further comprises a step where an amount of said hydrocracked hydrocarbon stream, optionally after fractionation, is directed as a recycled hydrocracked hydrocarbon stream to a position upstream said material catalytically active in hydrocracking, with the associated benefit of a recycle process being able to obtain high overall hydrocracking conversion but maintaining moderate conditions and thus moderate conversion per pass.

In a further embodiment the conditions of the hydrocracking step and the amount of recycled hydrocarbon stream are such that the ratio of the mass of hydrocarbons comprising at least 11 carbon atoms in the synthetic gasoline to the mass of hydrocarbons comprising at least 11 carbon atoms in the synthetic hydrocarbon mixture is less than 5%, with the associated benefit of a recycle process being able to obtain high overall hydrocracking conversion but maintaining moderate conditions and thus moderate conversion per pass.

In a further embodiment isomerization conditions involves a temperature in the interval 250-350° C., a pressure in the interval 30-150 Bar, and a liquid hourly space velocity (LHSV) in the interval 0.5-8 and wherein the material catalytically active in isomerization comprises one or more active metals taken from the group comprising platinum, palladium, nickel, cobalt, tungsten and molybdenum, one or more acidic supports, preferably molecular sieves, such as those having a topology taken from the group comprising MFI, FAU, BEA, MOR, FER, MRE, MWW, AEL, TON and MTT and an amorphous refractory support comprising one or more oxides taken from the group comprising alumina, silica and titania, with the associated benefit of such process conditions and catalytically active materials being highly suited for efficient conversion of especially pseudocumene to mesitylene. Typically, the amount the amount of psedocumene in said isomerized hydrocarbon stream is reduced by at least 20% wt, 50% wt or 80% wt or more compared to said intermediate boiling hydrocarbon fraction.

In a further embodiment said one or more active metals of said material catalytically active in isomerization are taken from the group consisting of nickel, cobalt, tungsten and molybdenum and the hydrocracking feedstock comprises at least 50 ppmw sulfur, with the associated benefit of such a material catalytically active in isomerization having a low cost.

In a further embodiment said one or more active metals of said material catalytically active in isomerization are taken from the group consisting of platinum and palladium and the hydrocracking feedstock comprises at less than 50 ppmw sulfur, with the associated benefit of such a material catalytically active in isomerization having a high selectivity.

A further aspect of the disclosure relates to a process for production of a synthetized gasoline product from a feedstock comprising methanol, said process comprising the steps of; directing a stream comprising methanol to contact a material catalytically active in methanol to gasoline conversion providing a raw synthetized gasoline, stabilizing said raw synthetized gasoline by separating a fraction boiling below 40° C. from the raw synthetized gasoline, providing a synthetic hydrocarbon mixture and directing said synthetic hydrocarbon mixture to react according to a method disclosed above, with the associated benefit of such a process making an efficient conversion of methanol to a synthetized gasoline matching strict requirements to distillation curve specifications.

A further aspect of the disclosure relates to a process plant for production of a synthetic gasoline product comprising a hydrocarbon synthesis section having an oxygenate inlet and a synthetic hydrocarbon outlet, a separation section, having an inlet and at least a gas fraction outlet, a light hydrocarbon outlet and a heavy hydrocarbon outlet and a hydrocracking section having an inlet and an outlet, wherein the separation section inlet is configured for being in fluid communication with the synthetic hydrocarbon outlet, the heavy hydrocarbon outlet is configured for being in fluid communication with the hydrocracking section inlet and the hydrocracking section outlet and the light hydrocarbon outlet are configured to be in fluid communication with a synthetic gasoline product outlet, characterized in the separation section being configured for separation of hydrocarbons with at least 10 carbon atoms to be directed to the heavy hydrocarbon outlet, with the associated benefit of such a process plant being highly efficient in producing synthetic gasoline with a moderate distillation end-point.

The conversion of methanol or methanol/dimethyl ether mixtures into gasoline is generally referred to as the Methanol-to-Gasoline (MTG) process, in which methanol is synthetized from a synthesis gas, which may be made by gasification of solid carbonaceous material or by reforming liquid or gaseous hydrocarbons, typically natural gas. The gasoline synthesis takes place in well-known fixed bed and/or fluidized bed reactors and is typically carried out at a pressure of 10-40 bar and a temperature of 280-450° C., preferably 300-430° C. The effluent from the gasoline synthesis section, which is enriched in gasoline components and water, light olefinic hydrocarbons, methane and paraffins, is cooled and passed to a three phase separating unit where a non-polar phase comprising hydrocarbons, a polar phase comprising water, oxygenated hydrocarbon by-products and unconverted oxygenates, and a gaseous phase comprising uncondensables ($H_2$, CO, $CO_2$ etc.), light ends ($CH_4$, $C_2H_6$) and light olefins are separated. The non-polar phase is normally split in a purge stream and a recycle stream.

Raw synthetic gasoline is typically fed to a degassing unit to remove fuel gas and LPG fraction and volatile by-products dissolved in the raw gasoline, to provide a stabilized synthetized gasoline. This degassing unit may be either independent or integrated into other means of separation for the synthetic gasoline.

Although the conversion of methanol or methanol/dimethyl ether mixtures into gasoline is generally referred to as the Methanol-to-Gasoline process, oxygen-containing hydrocarbons (oxygenates) other than methanol are also easily converted in the MTG process. Apart from the desired portion of especially $C_{5+}$ gasoline products and co-produced water, gasoline synthesis results in some by-production of olefins, paraffins, methane and products from thermal cracking (hydrogen, CO, $CO_2$). Subsequent separation and/or distillation ensures the upgrading of the raw hydrocarbon product mixture to useful gasoline. Naturally, a high yield of the useful gasoline products is desirable for obtaining proper process economy.

The synthesis gas for reacting to form the reactive oxygenates for the MTG process, may be made by gasification of solid carbonaceous material by processes well known to the skilled person. These processes may involve gasification of carbonaceous materials, such as coal, (typically heavy) hydrocarbons, solid waste and biomass; from reforming of hydrocarbons; from coke oven waste gas; from biogas or from combination of streams rich in carbon oxides and hydrogen—e.g. of electrolytic origin. Alternatively, the synthesis gas may be produced by reforming liquid or gaseous hydrocarbons, typically natural gas.

The synthesis section for the production of easily convertible oxygenates may consist of a one-step methanol synthesis, a two-step methanol synthesis, a two-step methanol synthesis followed by a DME synthesis, or a methanol synthesis step followed by a combined methanol and DME synthesis step and a DME synthesis step or a one-step combined methanol and DME synthesis. It would be understood that the number of possible combinations of means of co-feeding into the methanol/DME synthesis loop and the layouts of the methanol or methanol/dimethyl ether synthesis is large. Any combinations deductible is therefore to be regarded as embodiments of present invention.

The zeolite catalyst used for the conversion of oxygenates to gasoline products may be any zeolite type being known as useful for the conversion of oxygenates to gasoline range boiling hydrocarbons. Preferred types are those with a silica to alumina mole ratio of at least 12 and pore sizes formed by up to 12 membered rings, preferably 10 membered. Examples of such zeolites are those having one of the topologies MFI, MEL, MTW, MTT, FER such as ZSM-5, ZSM-11, ZSM-12, ZSM-23, ZSM-35 and ZSM-38. The manufacture of these is well known in the art and the catalysts are commercially available. Particularly preferred is the ZSM-5 in its hydrogen form, i.e. HZSM-5.

Compared to naphtha obtained by hydroprocessing of fossil hydrocarbons, the synthetic gasoline has a different carbon distribution, resulting into slightly heavier range of products, typically with a lower amount of C6 and C7 hydrocarbons, a higher amount of C8, C9 and C10 hydrocarbons as well as a presence of C11+ hydrocarbons in the 2-5 wt % range, which would be substantially absent in fractionated fossil hydro. A further difference between the nature of fossil gasoline and synthetic gasoline is the fact that fossil gasoline is a mixture of 100 to 1000 different molecules, whereas synthetic gasoline, whilst still being a mixture of hundreds of molecules, is dominated by 10 different molecules.

The C11+ hydrocarbons are often diaromatics, and are undesired in gasoline due to the potential formation of particulate matter during combustion.

A common C10 hydrocarbon in the synthetized gasoline product is durene (1,2,4,5-tetramethylbenzene), which has a melting point of 79.2° C. and a boiling point of 196° C. The high melting point is problematic for the final gasoline product, especially in cold climates. The other tetramethylbenzenes have a much lower melting point and a slightly higher boiling point.

Among the C9 hydrocarbons in the synthetized gasoline product, pseudocumene (1,2,4-trimethylbenzene) is the most abundant, whereas the isomer mesitylene (1,3,5-trimethylbenzene) is less common. The octane number of mesitylene is 171, i.e. higher than the octane number of 148 for pseudocumene but the melting point and boiling points are similar (mesitylene/pseudocumene m.p. of −45/−44° C. and b.p. of 165/169° C., respectively).

A synthetic gasoline product with lower content of C8+ compounds would be highly preferable, as the resulting boiling point distribution would be in compliance with restrictive regulations on distillation curve.

An isomerization process for the combined conversion of pseudocumene to mesitylene and durene to isodurene was proposed in WO2013/178375 A1. This process involves treating a heavy fraction of the synthetic gasoline over a sulfided nickel isomerization catalyst comprising a zeolite of the MFI topology such as ZSM-5, which increased selectivity for favorable isomerization over a non-sulfided catalyst.

This isomerization process will however not solve the problem of restrictive requirements to the distillation curve since the products of isomerization will boil at similar temperatures as the parent molecule. C11+ compounds, which are the main constituents of the distillation tail of the synthetic gasoline, are typically not converted to lower boiling products at the isomerization conditions in WO2013/178375 A1.

Other processes for improving the cold flow of synthetic gasoline are disclosed in U.S. Pat. No. 4,304,951, which has the objective of removing durene (C10) by directing the higher boiling synthetic hydrocarbon product to a hydroprocessing reaction where less than 50% of C10 are converted—by hydrocracking of only a high boiling fraction. This patent teaches that beyond protecting the low boiling fraction, the cut point is not critical, but that a cut point of 177° C. (350° F.) is preferred, and all experiments are carried out on a fraction separated at 177° C., and which accordingly includes a significant amount of C9 compounds.

A further aspect to keep in mind when considering the product composition of the MTG process, is that the MTG synthesis process results in a well-defined product composition, contrary to fossil gasoline. This has practical implications, e.g. on the separation processes, where the distillation curve for synthetic gasoline is not semi-continuous as for fossil feedstocks, and therefore the manipulation by fractionation is less flexible for synthesized gasoline compared to fossil gasoline.

To reduce the high boiling fraction of synthetized gasoline, the present disclosure propose hydrocracking a high boiling fraction of synthetized gasoline product in a selective hydrocracking process, which will convert at least an amount of the di-aromatics to monoaromatics and dealkylate multisubstituted monoaromatics to lower boiling compounds, thus making the middle and final parts of the product distillation curve lighter. The initial boiling point (IBP) of the heavy fraction that will be selectively hydrocracked is selected/determined according to an optimization of the conversion required to meet distillation points regulations whilst minimizing octane rating loss incurred by dealkylation and hydrogenation reactions.

Hydrocracking involves directing high boiling synthetic gasoline fraction to contact a material catalytically active in hydrocracking. The material catalytically active in hydrocracking typically comprises an active metal (which may be one or more sulfided base metals such as nickel, cobalt, tungsten and/or molybdenum or reduced noble metals such as Pt, Pd or PdPt), an acidic support (typically a molecular sieve showing high cracking activity, and having a topology such as MFI, BEA, FAU and MOR, but amorphous acidic oxides such as silica-alumina may also be used) and a refractory support (such as alumina, silica ortitania, or combinations thereof). The catalytically active material may comprise further components, such as boron or phosphorous.

The conditions are typically a temperature in the interval 250-430° C., a pressure in the interval 20-100 Bar, and a liquid hourly space velocity (LHSV) in the interval 0.3-10. Increasing temperature or decreasing LHSV will, as it is known to the skilled person, increase the process severity and thus the hydrocracking conversion, i.e. the amount of product having a lower molecular weight than the feedstock. As hydrocracking is exothermic, the process may involve intermediate cooling e.g. by quenching with cold hydrogen, feed or product. A high boiling synthetic gasoline fraction, including the treat gas, is typically directed to contact the material catalytically active in hydrocracking without further purification. When the active metal(s) on the material catalytically active in hydrocracking are base metals, this mixture of hydrocarbons and treat gas should preferably contain at least 50 ppmw sulfur and when it is a noble metal the sulfur level should preferably be below 10 ppmw sulfur.

In addition to the hydrocracking of the high boiling synthetic gasoline fraction, fractionation of the synthetic gasoline also makes it possible to direct the intermediate boiling synthetic gasoline fraction consisting of C9 and to some extent C10 compounds, to an isomerization process, said compounds undergoing isomerization reactions in order to boost the octane number with a minimal yield loss.

The material catalytically active in isomerization typically comprises an active metal (which according to the present disclosure is preferred to be sulfided base metals such as nickel, cobalt, tungsten and/or molybdenum alone or in combination or one or more elemental reduced metals such as nickel, platinum and/or palladium), an acidic support (typically a molecular sieve showing high shape selectivity, and having a topology such as MFI, FAU, BEA, MOR, FER, MRE, MWW, AEL, TON and MTT) and a typically amorphous refractory support (such as alumina, silica or titania, or combinations thereof). Specific examples are material catalytically active in isomerization comprising sulfided or reduced Ni in combination with ZSM-5, reduced Ni in combination with silica-alumina, sulfided NiW in combination with γ-alumina, reduced Pt in combination with ZSM-5, reduced Pt in combination with zeolite Y, all supported on an amorphous material, such as alumina. The catalytically active material may comprise further components, such as boron or phosphorous.

Typically, isomerization involves directing the intermediate synthetic gasoline fraction to contact a material catalytically active in isomerization. The conditions are typically a temperature in the interval 250-430° C., a pressure in the interval 50-100 Bar, and a liquid hourly space velocity (LHSV) in the interval 0.3-8. Increasing temperature or decreasing LHSV will, as it is known to the skilled person, increase the process severity and thus the isomerization conversion. Isomerization is substantially thermally neutral and consumes only hydrogen in hydrocracking side reactions so only a moderate amount of hydrogen is added in the isomerization reactor. If the active metal on the material catalytically active in isomerization is in elemental form, the isomerization feedstock must only comprise potential catalyst poisons in low levels such as levels of sulfur below 50 ppmw or even 1-10 ppmw, which may require purification. If the active metal is in sulfided form, a level of sulfur above 50 ppmw is required.

According to one embodiment of the present disclosure, the material catalytically active in hydrocracking is a base metal positioned downstream a noble metal based material catalytically active in hydroisomerization, and thus, in this embodiment, addition of a sulfur donor is required to maintain sulfidation, and thus activity, of the sulfided active metal.

By fractionating the synthetized gasoline product in a high boiling fraction, which is hydrocracked with a fairly high conversion and subsequently blended with other fractions, the blended product may be in compliance with strict boiling point curves, while minimizing yield loss. As some octane loss may be a consequence of the hydrocracking of the high boiling fraction, selective isomerization of an intermediate fraction may be desirable, to convert pseudocumene (1,2,4-trimethyl benzene, with octane number of 148) into the isomer mesitylene (1,3,5-trimethyl benzene, with octane number 171).

BRIEF DESCRIPTION OF THE FIGURES

FIG. 6 shows a process for producing a synthetized gasoline product according to the prior art, without post-treating.

FIG. 7 shows boiling point curves for an example according to the present disclosure.

FIG. 8 shows boiling point curves of the stabilized synthesized gasoline as well as intermediates and products of the process.

DETAILED DESCRIPTION

Figure 1:
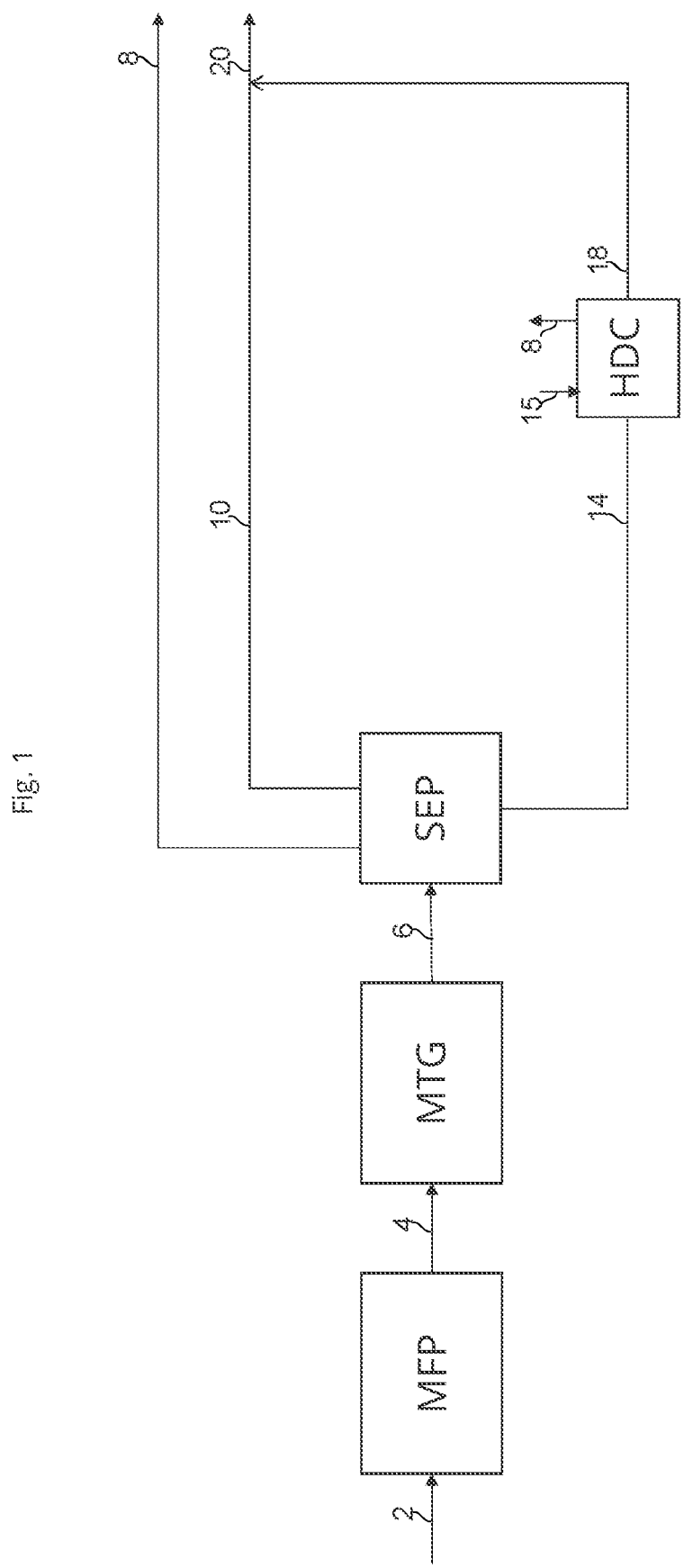
FIG. 1 shows a process for producing a synthetized gasoline product according to the present disclosure, post-treating a higher boiling hydrocarbon fraction by hydrocracking.

FIG. 1 shows a first exemplary embodiment of the present disclosure. Here a carbonaceous feed stream (2), typically natural gas, but optionally a solid feedstock such as coal or renewable feedstock, is directed to a methanol front-end process unit (MFP). For solid feedstock, a gasifier will produce a synthesis gas, whereas natural gas is converted to synthesis gas in a reformer. The synthesis gas is cleaned, and the composition may be adjusted to match the requirements of a downstream methanol synthesis unit, in which synthesis gas is catalytically converted to methanol. The produced methanol (4) is directed to a hydrocarbon synthesis unit (MTG) in which methanol is converted to a raw synthesized hydrocarbon mixture (6). The raw synthesized hydrocarbon mixture (6) is directed to a separation section (SEP), which may comprise several sub-units, typically including a three-phase separator, separating incondensable gases, water and raw gasoline. The raw hydrocarbon mixture is typically stabilized in a de-ethanizer and an LPG splitter, to provide one or more gaseous hydrocarbon streams and a synthesized hydrocarbon mixture. For simplicity the figure shows a single gas stream (8) comprising $H_2$, CO, $CH_4$, $C_2H_6$, $C_3H_8$, and $C_4H_{10}$, but in practice it is typically split in multiple fractions as described. The separation section further splits the synthesized hydrocarbon mixture in a light hydrocarbon fraction (10) boiling in the gasoline range, and typically comprising C4-C9 hydrocarbons and a higher boiling hydrocarbon fraction (14) comprising C10+ hydrocarbons.

The higher boiling hydrocarbon fraction (14) is, together with hydrogen (15), directed to a hydrocracking unit (HDC), in which the C10+ hydrocarbons are converted mainly to C9 hydrocarbons by hydrocracking. The hydrocracking unit (HDC) contains a material catalytically active in hydrocracking and is operated under hydrocracking conditions, to produce a hydrocracked higher boiling hydrocarbon fraction (18). The product of the hydrocracking unit is typically stabilized in a separator, by withdrawing light gases (8). The light hydrocarbon fraction (10) and the hydrocracked higher boiling hydrocarbon fraction (18) are combined, to provide a synthetized gasoline product (20).

Figure 2:
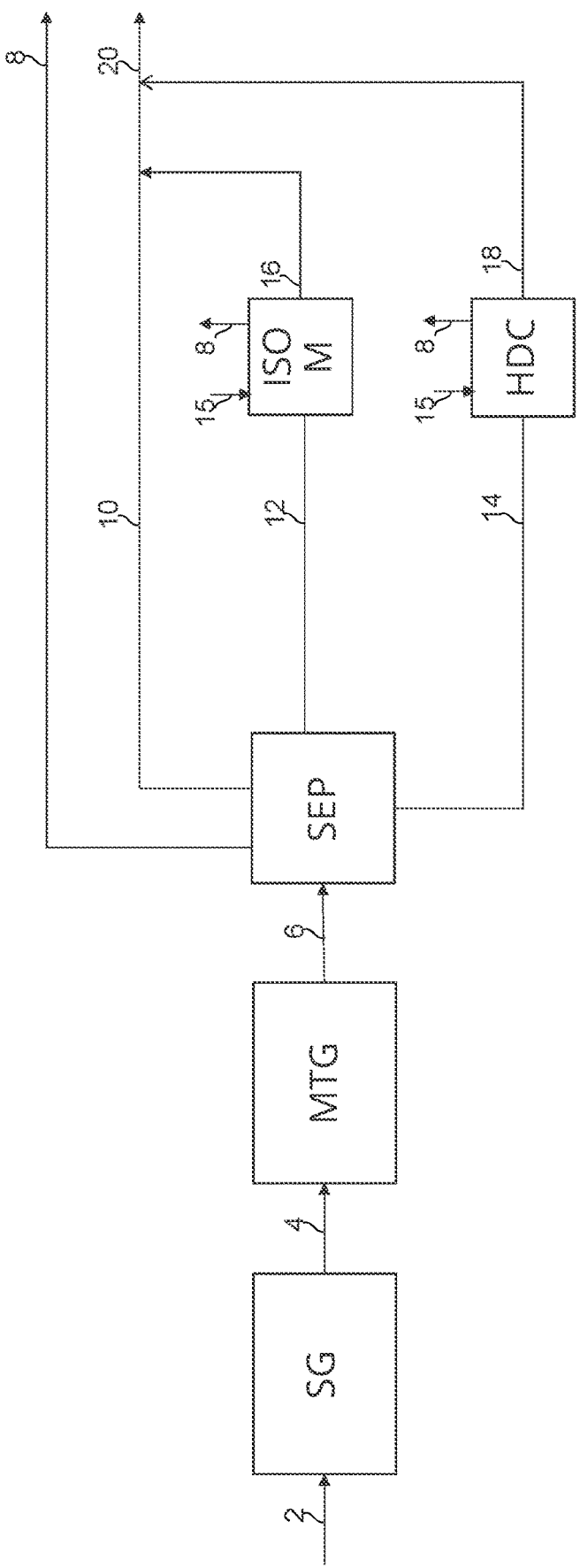
FIG. 2 shows a process for producing a synthetized gasoline product according to the present disclosure, post-treating an intermediate boiling hydrocarbon fraction by isomerization and a higher boiling hydrocarbon fraction by hydrocracking.

FIG. 2 shows an embodiment of the present disclosure, which is configured for an improved octane number rating, by inclusion of an isomerization unit. Here a carbonaceous feed stream (2), typically natural gas, but optionally a solid feedstock such as coal or renewable feedstock, is directed to a methanol front-end process unit (MFP). For solid feedstock, a gasifier will produce a synthesis gas, whereas natural gas is converted to synthesis gas in a reformer. The synthesis gas is cleaned, and the composition may be adjusted to match the requirements of a downstream methanol synthesis unit, in which synthesis gas is catalytically converted to methanol. The produced methanol (4) is directed to a hydrocarbon synthesis unit (MTG) in which methanol is converted to a raw synthesized hydrocarbon mixture (6). The raw synthesized hydrocarbon mixture (6) is directed to a separation section (SEP), which may comprise several sub-units, typically including a three-phase separator, separating incondensable gases, water and raw gasoline. The raw hydrocarbon mixture is typically stabilized in a de-ethanizer and an LPG splitter, to provide one or more gaseous hydrocarbon streams and a synthesized hydrocarbon mixture. For simplicity the figure shows a single gas stream (8) comprising $H_2$, CO, $CH_4$, $C_2H_6$, $C_3H_8$, and $C_4H_{10}$, but in practice it is typically split in multiple fractions as described. The separation section further splits the synthesized hydrocarbon mixture in a light hydrocarbon fraction (10) boiling in the gasoline range, and typically comprising C4-C8 hydrocarbons, an intermediate boiling hydrocarbon fraction (12), typically dominated by C9 hydrocarbons and a higher boiling hydrocarbon fraction (14) comprising C10+ hydrocarbons.

The intermediate boiling hydrocarbon fraction (12) is, together with hydrogen (15), directed to a hydroisomerization unit (ISOM), in which pseudocumene is converted to mesitylene, resulting in increased octane number providing an isomerized intermediate hydrocarbon fraction (16). The product of the hydroisomerization unit is typically stabilized in a separator, by withdrawing light gases (8). The higher boiling hydrocarbon fraction (14) is, together with hydrogen (15), directed to a hydrocracking unit (HDC), in which the C10+ hydrocarbons are converted mainly to C9 hydrocarbons by hydrocracking, providing a hydrocracked higher hydrocarbon fraction (18). The product of the hydrocracking unit is typically stabilized in a separator, by withdrawing light gases (8). The light hydrocarbon fraction (10), the isomerized intermediate hydrocarbon fraction (16) and the hydrocracked higher boiling hydrocarbon fraction (18) are combined, to provide a synthetized gasoline product (20).

Figure 3:
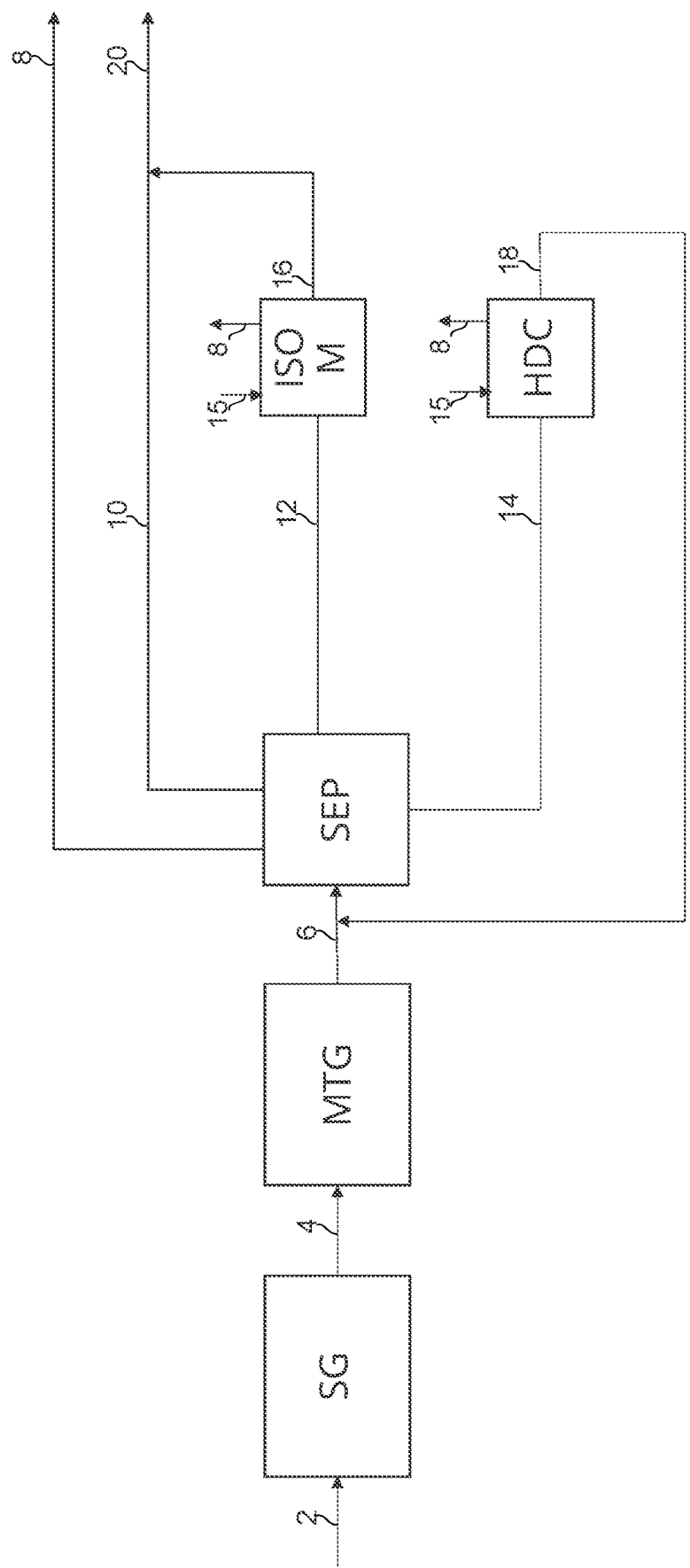
FIG. 3 shows a process for producing a synthetized gasoline product according to the present disclosure, post-treating an intermediate boiling hydrocarbon fraction by isomerization and a higher boiling hydrocarbon fraction by hydrocracking with recycle.

FIG. 3 shows an embodiment of the present disclosure, which is configured for an improved octane number rating, by inclusion of an isomerization unit, and for maximizing the gasoline yield by a low extent of hydrocracking per pass in combination with recycling the hydrocracked higher boiling hydrocarbon fraction. Here a carbonaceous feed stream (2), typically natural gas, but optionally a solid feedstock such as coal or renewable feedstock, is directed to a methanol front-end process unit (MFP). For solid feedstock, a gasifier will produce a synthesis gas, whereas natural gas is converted to synthesis gas in a reformer. The synthesis gas is cleaned, and the composition may be adjusted to match the requirements of a downstream methanol synthesis unit, in which synthesis gas is catalytically converted to methanol. The produced methanol (4) is directed to a hydrocarbon synthesis unit (MTG) in which methanol is converted to a raw synthesized hydrocarbon mixture (6). The raw synthesized hydrocarbon mixture (6) is directed to a separation section (SEP), which may comprise several sub-units, typically including a three-phase separator, separating incondensable gases, water and raw gasoline. The raw hydrocarbon mixture is typically stabilized in a de-ethanizer and an LPG splitter, to provide one or more gaseous hydrocarbon streams and a synthesized hydrocarbon mixture. For simplicity the figure shows a single gas stream (8) comprising $H_2$, CO, $CH_4$, $C_2H_6$, $C_3H_8$, and $C_4H_{10}$, but in practice it is typically split in multiple fractions as described. The separation section further splits the synthesized hydrocarbon mixture in a light hydrocarbon fraction (10) boiling in the gasoline range, and typically comprising C4-C8 hydrocarbons, an intermediate boiling hydrocarbon fraction (12), typically dominated by C9 hydrocarbons and a higher boiling hydrocarbon fraction (14) comprising C10+ hydrocarbons.

The intermediate boiling hydrocarbon fraction (12) is, together with hydrogen (15), directed to a hydroisomerization unit (ISOM), in which pseudocumene is converted to mesitylene, resulting in increased octane number providing an isomerized intermediate hydrocarbon fraction (16). The product of the hydroisomerization unit is typically stabilized in a separator, by withdrawing light gases (8). The higher boiling hydrocarbon fraction (14) is, together with hydrogen (15), directed to a hydrocracking unit (HDC), in which the C10+ hydrocarbons are converted mainly to C9 hydrocarbons by hydrocracking, providing a hydrocracked higher hydrocarbon fraction (18). The product of the hydrocracking unit is typically stabilized in a separator, by withdrawing light gases (8). The hydrocracked higher hydrocarbon fraction (18) is directed to feed the separation section (SEP), such that light and intermediate boiling hydrocracked products are directed to the light hydrocarbon fraction (10) and intermediate boiling hydrocarbon fraction (12), whereas the higher boiling hydrocracked products are directed to the higher boiling hydrocarbon fraction (14), and thus recycled to the inlet of the hydrocracking unit (HDC), allowing milder hydrocracking conditions per pass, as any unconverted high boiling hydrocarbons will be recycled. The light hydrocarbon fraction (10), the isomerized intermediate hydrocarbon fraction (16) and the hydrocracked higher boiling hydrocarbon fraction (18) are combined, to provide a synthetized gasoline product (20).

Figure 4:
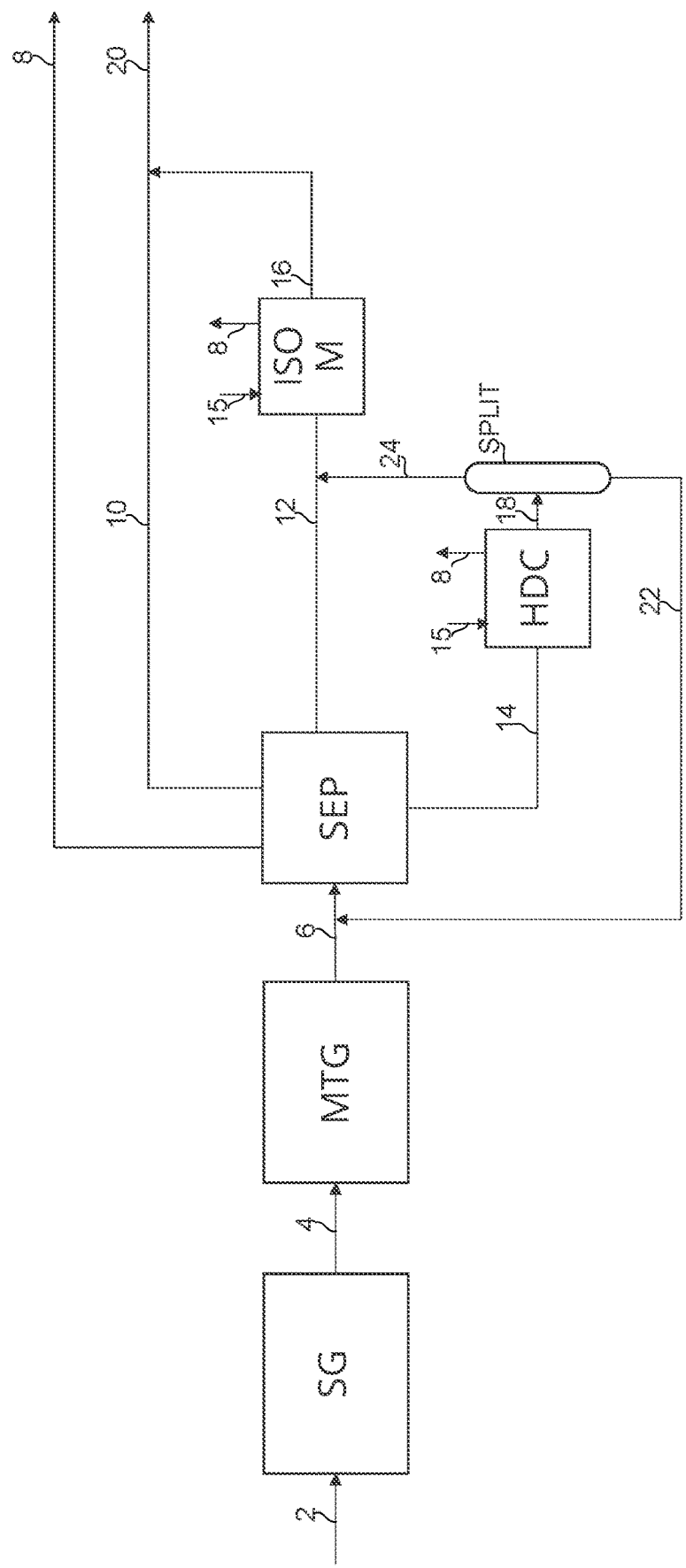
FIG. 4 shows a process for producing a synthetized gasoline product according to the present disclosure, post-treating an intermediate boiling hydrocarbon fraction by isomerization and a higher boiling hydrocarbon fraction by hydrocracking with recycle and fractionation of the hydrocracked hydrocarbon fraction.

FIG. 4 shows an embodiment of the present disclosure, which is configured for an improved octane number, conversion of high boiling hydrocarbons and yield, by inclusion of a recycle line, an isomerization unit and an intermediate product separation. Here a carbonaceous feed stream (2), typically natural gas, but optionally a solid feedstock such as coal or renewable feedstock, is directed to a methanol front-end process unit (MFP). For solid feedstock, a gasifier will produce a synthesis gas, whereas natural gas is converted to synthesis gas in a reformer. The synthesis gas is cleaned, and the composition may be adjusted to match the requirements of a downstream methanol synthesis unit, in which synthesis gas is catalytically converted to methanol. The produced methanol (4) is directed to a hydrocarbon synthesis unit (MTG) in which methanol is converted to a raw synthesized hydrocarbon mixture (6). The raw synthesized hydrocarbon mixture (6) is directed to a separation section (SEP), which may comprise several sub-units, typically including a three-phase separator, separating incondensable gases, water and raw gasoline. The raw hydrocarbon mixture is typically stabilized in a de-ethanizer and an LPG splitter, to provide one or more gaseous hydrocarbon streams and a synthesized hydrocarbon mixture. For simplicity the figure shows a single gas stream (8) comprising $H_2$, CO, $CH_4$, $C_2H_6$, $C_3H_8$, and $C_4H_{10}$, but in practice it is typically split in multiple fractions as described. The separation section further splits the synthesized hydrocarbon mixture in a light hydrocarbon fraction (10) boiling in the gasoline range, and typically comprising C4-C8 hydrocarbons, an intermediate boiling hydrocarbon fraction (12), typically dominated by C9 hydrocarbons and a higher boiling hydrocarbon fraction (14) comprising C10+ hydrocarbons.

The intermediate boiling hydrocarbon fraction (12) is, together with hydrogen (15), directed to a hydroisomerization unit (ISOM), in which pseudocumene is converted to mesitylene, resulting in increased octane number providing an isomerized intermediate hydrocarbon fraction (16). The product of the hydroisomerization unit is typically stabilized in a separator, by with-drawing light gases (8). The higher boiling hydrocarbon fraction (14) is, together with hydrogen (15), directed to a hydrocracking unit (HDC), in which the C10+ hydrocarbons are converted mainly to C9 hydrocarbons by hydrocracking, providing a hydrocracked higher hydrocarbon fraction (18). The product of the hydrocracking unit is typically stabilized in a separator, by withdrawing light gases (8). The hydrocracked higher hydrocarbon fraction (18) is directed to a splitter section (SPLIT) splitting the hydrocracked higher hydrocarbon fraction (16) in a light hydrocracked hydrocarbon fraction (24) and a heavy hydrocracked hydrocarbon fraction (22). The heavy hydrocracked hydrocarbon fraction (22) is directed to the separation section (SEP). In comparison with FIG. 3 this reduces yield loss, as only the unconverted part of the heavy hydrocracked hydrocarbon fraction (22) is recycled. The light hydrocracked hydrocarbon fraction (24) is directed as a feed to the hydroisomerization unit (ISOM). The light hydrocarbon fraction (10), the isomerized intermediate hydrocarbon fraction (16) and the hydrocracked higher boiling hydrocarbon fraction (18) are combined, to provide a synthetized gasoline product (20).

Figure 5:
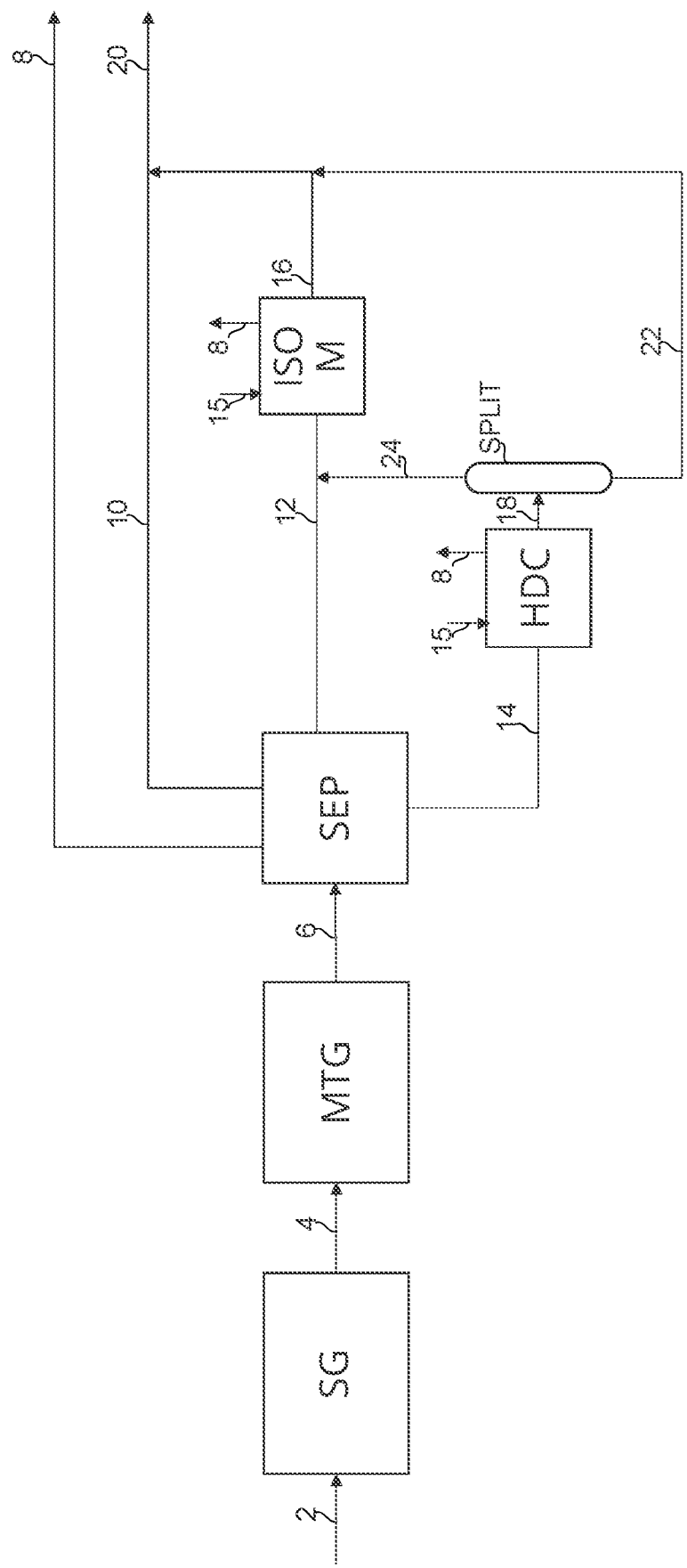
FIG. 5 shows a process for producing a synthetized gasoline product according to the present disclosure, post-treating an intermediate boiling hydrocarbon fraction by isomerization and a higher boiling hydrocarbon fraction by hydrocracking with fractionation of the hydrocracked hydrocarbon fraction but without recycle.

FIG. 5 shows an embodiment of the present disclosure, which is configured for an improved octane number, conversion of high boiling hydrocarbons and yield, by inclusion of a product separation. Here a carbonaceous feed stream (2), typically natural gas, but optionally a solid feedstock such as coal or renewable feedstock, is directed to a methanol front-end process unit (MFP). For solid feedstock, a gasifier will produce a synthesis gas, whereas natural gas is converted to synthesis gas in a reformer. The synthesis gas is cleaned, and the composition may be adjusted to match the requirements of a downstream methanol synthesis unit, in which synthesis gas is catalytically converted to methanol. The produced methanol (4) is directed to a hydrocarbon synthesis unit (MTG) in which methanol is converted to a raw synthesized hydrocarbon mixture (6). The raw synthesized hydrocarbon mixture (6) is directed to a separation section (SEP), which may comprise several sub-units, typically including a three-phase separator, separating incondensable gases, water and raw gasoline. The raw hydrocarbon mixture is typically stabilized in a de-ethanizer and an LPG splitter, to provide one or more gaseous hydrocarbon streams and a synthesized hydrocarbon mixture. For simplicity the figure shows a single gas stream (8) comprising $H_2$, CO, $CH_4$, $C_2H_6$, $C_3H_8$, and $C_4H_{10}$, but in practice it is typically split in multiple fractions as described. The separation section further splits the synthesized hydrocarbon mixture in a light hydrocarbon fraction (10) boiling in the gasoline range, and typically comprising C4-C8 hydrocarbons, an intermediate boiling hydrocarbon fraction (12), typically dominated by C9 hydrocarbons and a higher boiling hydrocarbon fraction (14) comprising C10+ hydrocarbons.

The intermediate boiling hydrocarbon fraction (12) is, together with hydrogen (15), directed to a hydroisomerization unit (ISOM), in which pseudocumene is converted to mesitylene, resulting in increased octane number providing an isomerized intermediate hydrocarbon fraction (16). The product of the hydroisomerization unit is typically stabilized in a separator, by with-drawing light gases (8). The higher boiling hydrocarbon fraction (14) is, together with hydrogen (15), directed to a hydrocracking unit (HDC), in which the C10+ hydrocarbons are converted mainly to C9 hydrocarbons by hydrocracking, providing a hydrocracked higher hydrocarbon fraction (18). The product of the hydrocracking unit is typically stabilized in a separator, by withdrawing light gases (8). The hydrocracked higher hydrocarbon fraction (18) is directed to a splitter section (SPLIT) splitting the hydrocracked higher hydrocarbon fraction (16) in a light hydrocracked hydrocarbon fraction (24) and a heavy hydrocracked hydrocarbon fraction (22). The light hydrocracked hydrocarbon fraction (24) is directed as a feed to the hydroisomerization unit (ISOM). The light hydrocarbon fraction (10), the isomerized intermediate hydrocarbon fraction (16) and the heavy hydrocracked hydrocarbon fraction (22) are combined, to provide a synthetized gasoline product (20).

FIG. 6 shows an embodiment according to the prior art, without post-treatment of the synthetic hydrocarbon mixture. Here a carbonaceous feed stream (2), typically natural gas, but optionally a solid feedstock such as coal or renewable feedstock, is directed to a methanol front-end process unit (MFP). For solid feedstock, a gasifier will produce a synthesis gas, whereas natural gas is converted to synthesis gas in a reformer. The synthesis gas is cleaned, and the composition may be adjusted to match the requirements of a downstream methanol synthesis unit, in which synthesis gas is catalytically converted to methanol. The produced methanol (4) is directed to a hydrocarbon synthesis unit (MTG) in which methanol is converted to a raw synthesized hydrocarbon mixture (6). The raw synthesized hydrocarbon mixture (6) is directed to a separation section (SEP), which may comprise several sub-units, typically including a three-phase separator, separating incondensable gases, water and raw gasoline. The raw hydrocarbon mixture is typically stabilized in a de-ethanizer and an LPG splitter, to provide one or more gaseous hydrocarbon streams and a synthesized hydrocarbon mixture. For simplicity the figure shows a single gas stream (8) comprising $H_2$, CO, $CH_4$, $C_2H_6$, $C_3H_8$, and $C_4H_{10}$, but in practice it is typically split in multiple fractions as described. The separation section further splits the synthesized hydrocarbon mixture in a light hydrocarbon fraction (10) boiling in the gasoline range, and typically comprising C4-C9 hydrocarbons and optionally a higher boiling hydrocarbon fraction (14) comprising C10+ or C11+ hydrocarbons, which may be directed for use as fuel oil.

In all embodiments shown, the hydrocracking unit (HDC) contains a material catalytically active in hydrocracking and is operated under hydrocracking conditions. If the material catalytically active in hydrocracking comprises sulfided base metals, a source of sulfide must be present in the higher boiling hydrocarbon, typically by addition of a sulfur containing hydrocarbon. If the material catalytically active in hydrocracking comprises reduced metals, the separation section must be designed to remove sulfides from the higher boiling hydrocarbon, at least to a level below 50 ppmw. If no recycle is applied, the process may typically be configured for a high hydrocracking conversion of higher boiling hydrocarbon to ensure that the product complies with the relevant requirements, whereas the process may be configured for low or moderate hydrocracking conversion if recycle is applied.

Similarly the hydroisomerization unit (ISOM), if present, contains a material catalytically active in hydroisomerization and is operated under hydroisomerization conditions. If the material catalytically active in hydroisomerization comprises sulfided base metals, a source of sulfide must be present in the intermediate boiling hydrocarbon fraction, typically by addition of a sulfur containing hydrocarbon. If the material catalytically active in hydroisomerization comprises reduced metals, the separation section must be designed to remove sulfides from the intermediate boiling hydrocarbon fraction, at least to a level below 50 ppmw, which may be accomplished during the stabilization of the synthetized gasoline.

In embodiments involving splitting the hydrocracked higher hydrocarbon fraction (16), the light hydrocracked hydrocarbon fraction (24) may be alternatively directed to be included in the synthetized gasoline product (20) without intermediate reaction.

EXAMPLES

A process for production of synthetized gasoline via a methanol route was evaluated by experimental testing of a stabilized synthetized hydrocarbons having the composition and characteristics shown in Table 1. The heavy end of this product is not in compliance with the restrictive regulations discussed.

Example 1

This product was then upgraded in a process corresponding to FIG. 1, and the amount of selected compounds in selected streams is reported in Table 1, where stream 6' indicates a stream corresponding to stream 6, after stabilization.

An experiment setup was designed, for fractionation of stabilized synthetized gasoline (6') into in a light hydrocarbon fraction (10) and in a higher boiling hydrocarbon fraction (14) with a nominal boiling range 150° C.+. The fractionation separated the stabilized synthesized gasoline with 70 wt % in a light hydrocarbon fraction (10) and 30 wt % in a higher boiling hydrocarbon fraction (14). FIG. 7 shows boiling point curves of the stabilized synthesized gasoline (6') as well as intermediates and products of the process.

The higher boiling hydrocarbon fraction (14) was doped with DMDS to a total sulfur content of 60 wt ppm. A summarized composition of the higher boiling hydrocarbon fraction (14) according to ASTM D6729 is shown in Table 1. It is seen that the composition is dominated by aromatic C9 (41 wt %) and C10 (34 wt %) molecules, but 8.7 wt % are present in a C11+ fraction. These molecules are mainly tri-methyl benzenes and tetra-methyl-benzenes.

The higher boiling hydrocarbon fraction (14) was together with pure $H_2$ directed to an isothermal pilot plant reactor, which was loaded with the commercial catalyst TK-961 from HaldorTopsøe A/S of Lyngby, Denmark, which is a zeolitic NiW based hydrocracking catalyst. The catalyst was sulfided prior to the introduction of the higher boiling hydrocarbon fraction (14).

The reaction conditions were varied to ensure a proper product composition by adjusting temperature, hydrogen pressure and space velocity to obtain a severity corresponding to 65 wt % true conversion of C10+, which ensured a final synthetized gasoline product (20) in conformance with the following exemplary requirements to maximum boiling point curve temperatures D86 $T_{10}$ below 70° C., a D86 $T_{50}$ of 104° C., a D86 $T_{90}$ below 168° C. as well as a D86 final boiling point below 225° C. The yield loss, calculated from the feed of stabilized synthesized gasoline (6') and the synthetized gasoline product (20) was 7.8%.

Example 2

A further experiment was carried out, for fractionation of a second stabilized synthesized gasoline (6') into a combined light hydrocarbon fraction (10), and an intermediate boiling hydrocarbon fraction (12) with a nominal boiling range of 190° C.– and a higher boiling hydrocarbon fraction (14) with a nominal boiling range 190° C.+. The fractionation separated the stabilized synthesized gasoline with 65 wt % in a light hydrocarbon fraction (10), an intermediate boiling fraction 17 wt % (12) and 15 wt % in a higher boiling hydrocarbon fraction (14). FIG. 8 shows boiling point curves of the stabilized synthesized gasoline (6') as well as intermediates and products of the process.

The higher boiling hydrocarbon fraction (14) was doped with DMDS to a total sulfur content of 100 wt ppm. A summarized composition of the higher boiling hydrocarbon fraction (14) according to ASTM D6729 is shown in Table 1. It is seen that the composition is dominated by aromatic C10 (85 wt %) molecules, and 10 wt % are present in a C11+ fraction. The C10 molecules are mainly tetra-methyl-benzenes and other aromatic compounds with 10 carbons.

In this example, the intermediate boiling hydrocarbon fraction (12) was not treated further, but it may optionally together with pure $H_2$ be directed to a reactor, which is loaded with an isomerization catalyst, such as zeolitic Ni based hydrocracking catalyst, to increase the octane rating by conversion of pseudocumene into the isomer mesitylene.

The higher boiling hydrocarbon fraction (14) was together with pure $H_2$ directed to an isothermal pilot plant reactor, which was loaded with the commercial catalyst TK-961 from HaldorTopsøe A/S of Lyngby, Denmark, which is a zeolitic NiW based hydrocracking catalyst. The catalyst was sulfided prior to the introduction of the higher boiling hydrocarbon fraction (14).

The reaction conditions were varied to ensure a proper product composition by adjusting temperature, hydrogen pressure and space velocity to obtain a severity corresponding to 94 wt % true conversion of C10+, which ensured a final synthetized gasoline product (20) in conformance with the following exemplary requirements to maximum boiling point curve temperatures D86 $T_{10}$ below 70° C., a D86 $T_{50}$ below 104° C., a D86 $T_{90}$ below 168° C. as well as a D86 final boiling point below 225° C. The yield loss, calculated from the feed of stabilized synthesized gasoline (6') and the synthetized gasoline product (20) was 5.4%. This reduced yield loss was obtained due to a lower fraction (15% vs. 30%) being treated, albeit at a higher severity.

As for Example 1, the boiling point curves of feedstock and intermediates—as determined by simulated distillation ASTM D7213 and of product—as determined by ASTM D86, are shown in FIG. 8, together with arrows indicating the relations between streams. In addition, diamond symbols (◊) indicate the mentioned restrictions on maximum boiling point curve temperatures. The stabilized synthesized gasoline (6') is shown with a full line and it is split by fractionation (SEP) to a light hydrocarbon fraction (10, dotted line) and a higher boiling hydrocarbon fraction (14, dashed line). The higher boiling hydrocarbon fraction (14) is converted by hydrocracking (HDC) to a hydrocracked higher boiling hydrocarbon fraction (18, tight dashed line) which is combined (MIX) with the light hydrocarbon fraction (10) to obtain the synthetized gasoline product (20, dash-dotted line). The resulting synthetized gasoline product (20) is clearly moved to the left, and is in all positions to the left of the maximum temperatures, indicating conformance with the requirements.

Although Example 1 and Example 2 related to not exactly the same raw gasoline batch, the examples clearly show the possibility to adjust the boiling point curve of synthesized gasoline by hydrocracking, and furthermore, that this may be done with significantly lower yield loss if the fraction directed to hydrocracking is carefully selected.

The steep sections of the heavy hydrocarbon curve at 170° C. and 196° C. indicate a chemical homogeneity, due to high amounts of tri-methyl benzenes and tetra-methyl benzenes respectively. This homogeneity increases the sensitivity towards operating parameters, in comparison with the much more heterogeneous composition of fossil gasoline.

If hydrocracking had been practiced on the full stabilized synthesized gasoline (6') this process would be exothermic and difficult to control, and a significant yield loss, estimated to 12-15% would have been observed, which is similar to the loss of rejecting the heavy fraction, for use as heat source.

TABLE 1

| Composition | Example 1 % (wt) | Example 2 % (wt) |
| --- | --- | --- |
| C6 | 0.7 | 0.0 |
| C7 | 1.2 | 0.0 |
| C8 | 4.1 | 0.2 |
| C9 | 43 | 5.4 |
| C10 | 38 | 84.1 |
| C11 | 6.1 | 6.9 |
| C12 | 2.6 | 3.4 |
| n-Parafinic | 0.9 | 0.0 |
| Iso-parafinic | 6.5 | 0.6 |
| Olefinic | 1.3 | 0.0 |
| Naphthenic | 3 | 0.2 |
| Aromatic | 84.7 | 99.2 |

The invention claimed is:

1. A method for production of a synthetized gasoline product, comprising at least 20 wt % aromatics, from a synthetic hydrocarbon mixture produced from a mixture of reactive oxygenates comprising the steps of:
   a. separating the synthetic hydrocarbon mixture in at least a light hydrocarbon fraction, and a higher boiling hydrocarbon fraction, wherein the higher boiling fraction comprises at least 80% of the molecules comprising 10 or more carbon atoms present in the hydrocarbon mixture and less than 20% of the molecules comprising exactly 9 carbon atoms present in the synthetic hydrocarbon mixture; and b. directing at least an amount of said higher boiling hydrocarbon fraction as a hydrocracking feedstock to contact a material catalytically active in hydrocracking under effective hydrocracking conditions providing a hydrocracked hydrocarbon stream, wherein at least an amount of said hydrocracked hydrocarbon stream, optionally after further hydroprocessing, is combined with at least an amount of said light hydrocarbon fraction, to provide said synthetized gasoline product having a $T_{90}$ according to ASTM D86 being below the $T_{90}$ according to ASTM D86 of said synthetic hydrocarbon mixture.

2. The method according to claim 1, wherein an isomerization feedstock being an amount of the synthetic hydrocarbon mixture, is directed to contact a material catalytically active in isomerization under effective isomerization conditions, and wherein the isomerization feedstock contains at least 70% of the molecules comprising exactly 9 carbon atoms of the synthetic hydrocarbon mixture.

3. The method according to claim 2, wherein aromatics comprising 10 or more carbon atoms in the isomerization feedstock accounts for less than 5% of aromatics comprising 10 or more carbon atoms in the synthetic hydrocarbon mixture.

4. The method according to claim 1, wherein effective hydrocracking conditions involve a temperature in the interval 250-425° C., a pressure in the interval 30-150 Bar, and a liquid hourly space velocity (LHSV) in the interval 0.5-4, optionally together with intermediate cooling by quenching with hydrogen, feed or product and wherein the material catalytically active in hydrocracking comprises (a) one or more active metals taken from the group platinum, palladium, nickel, cobalt, tungsten and molybdenum, (b) an acidic support showing cracking activity, and (c) a refractory support.

5. The method according to claim 4, wherein said one or more active metals of said material catalytically active in hydrocracking are taken from the group consisting of nickel, cobalt, tungsten and molybdenum and wherein the hydrocracking feedstock contacting the material catalytically active in hydrocracking comprises at least 50 ppmw sulfur.

6. The method according to claim 4, wherein said one or more active metals of said material catalytically active in hydrocracking are taken from the group consisting of platinum and palladium and where in the hydrocracking feedstock contacting the material catalytically active in hydrocracking comprises less than 50 ppmw sulfur.

7. The method according to claim 1, wherein said hydrocracking process conditions are chosen, such that the ratio between hydrocarbons comprising exactly 10 carbon atoms in the hydrocracked hydrocarbon stream and the hydrocracking feedstock is less than 20%.

8. The method according to claim 1, further comprising a step where an amount of said hydrocracked hydrocarbon stream, optionally after fractionation, is directed as a recycled hydrocracked hydrocarbon stream to a position upstream said material catalytically active in hydrocracking.

9. The method according to claim 8, where the conditions of the hydrocracking step and the amount of recycled hydrocarbon stream are such that the ratio of the mass of hydrocarbons comprising at least 11 carbon atoms in the synthetic gasoline to the mass of hydrocarbons comprising at least 11 carbon atoms in the synthetic hydrocarbon mixture is less than 5%.

10. The method according to claim 2, wherein effective isomerization conditions involves a temperature in the interval 250-350° C., a pressure in the interval 30-150 Bar, and a liquid hourly space velocity (LHSV) in the interval 0.5-8 and wherein the material catalytically active in isomerization comprises one or more active metals taken from the group comprising platinum, palladium, nickel, cobalt, tungsten and molybdenum, one or more acidic supports, and an amorphous refractory support comprising one or more oxides taken from the group comprising alumina, silica and titania.

11. The method according to claim 10, wherein said one or more active metals of said material catalytically active in isomerization are taken from the group consisting of nickel, cobalt, tungsten and molybdenum and where in the hydrocracking feedstock comprises at least 50 ppmw sulfur.

12. The method according to claim 10, wherein said one or more active metals of said material catalytically active in isomerization are taken from the group consisting of platinum and palladium and where in the hydrocracking feedstock comprises less than 50 ppmw sulfur.

13. A process for production of a synthetized gasoline product from a feedstock comprising methanol, said process comprising the steps of:

a. directing a stream comprising methanol to contact a material catalytically active in methanol to gasoline conversion providing a raw synthetized gasoline;

b. stabilizing said raw synthetized gasoline by separating a fraction boiling below 40° C. from the raw synthetized gasoline, thereby providing a synthetic hydrocarbon mixture; and c. directing said synthetic hydrocarbon mixture to react according to a method according to claim 1.

14. A process plant for production of a synthetic gasoline product comprising at least 20 wt % aromatics, from a synthetic hydrocarbon mixture produced from a mixture of reactive oxygenates, wherein the plant is configured to operate a process comprising the steps of:

a. separating the synthetic hydrocarbon mixture in at least a light hydrocarbon fraction, and a higher boiling hydrocarbon fraction, wherein the higher boiling fraction comprises at least 80% of the molecules comprising 10 or more carbon atoms present in the hydrocarbon mixture and less than 20% of the molecules comprising exactly 9 carbon atoms present in the synthetic hydrocarbon mixture; and b. directing at least an amount of said higher boiling hydrocarbon fraction as a hydrocracking feedstock to contact a material catalytically active in hydrocracking under effective hydrocracking conditions providing a hydrocracked hydrocarbon stream, wherein at least an amount of said hydrocracked hydrocarbon stream, optionally after further hydroprocessing, is combined with at least an amount of said light hydrocarbon fraction, to provide said synthetized gasoline product having a T90 according to ASTM D86 being below the T90 according to ASTM D86 of said synthetic hydrocarbon mixture, the process plant comprising a hydrocarbon synthesis section having an oxygenate inlet and a synthetic hydrocarbon outlet, a separation section, having an inlet and at least a gas fraction outlet, a light hydrocarbon outlet and a heavy hydrocarbon outlet and a hydrocracking section having an inlet and an outlet, wherein the separation section inlet is configured for being in fluid communication with the synthetic hydrocarbon outlet, the heavy hydrocarbon outlet is configured for being in fluid communication with the hydrocracking section inlet and the hydrocracking section outlet and the light hydrocarbon outlet are configured to be in fluid communication with a synthetic gasoline product outlet, wherein the separation section being configured for separation of hydrocarbons with at least 10 carbon atoms to be directed to the heavy hydrocarbon outlet.

* * * * *